United States Patent
Kodaypak

(10) Patent No.: US 9,979,604 B2
(45) Date of Patent: May 22, 2018

(54) NETWORK MANAGEMENT FOR CONTENT BROADCAST

(71) Applicant: AT&T INTELLECTUAL PROPERTY I, L.P., Atlanta, GA (US)

(72) Inventor: Rajendra Prasad Kodaypak, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 131 days.

(21) Appl. No.: 14/825,119

(22) Filed: Aug. 12, 2015

(65) Prior Publication Data
US 2017/0048111 A1 Feb. 16, 2017

(51) Int. Cl.
H04L 12/24 (2006.01)
H04W 24/00 (2009.01)
H04W 4/06 (2009.01)

(52) U.S. Cl.
CPC .............. *H04L 41/12* (2013.01); *H04W 4/06* (2013.01); *H04W 24/00* (2013.01)

(58) Field of Classification Search
None
See application file for complete search history.

(56) References Cited

U.S. PATENT DOCUMENTS

| | | | |
|---|---|---|---|
| 7,957,745 B2 | 6/2011 | Cai et al. | |
| 8,199,741 B2 | 6/2012 | Al et al. | |
| 8,233,446 B2 | 7/2012 | Vedantham et al. | |
| 8,320,290 B2 | 11/2012 | Chao et al. | |
| 8,493,891 B2 | 7/2013 | Zhang | |
| 8,611,833 B2 | 12/2013 | Cai et al. | |
| 8,615,271 B2 | 12/2013 | Chuberre et al. | |
| 8,654,757 B2 | 2/2014 | Ai et al. | |
| 8,711,794 B2 | 4/2014 | Yun et al. | |
| 8,797,939 B2 | 8/2014 | Al | |
| 8,855,037 B2 | 10/2014 | Zhai et al. | |
| 8,879,457 B2 | 11/2014 | Zhai et al. | |
| 8,891,426 B2 | 11/2014 | Widegren | |
| 9,042,292 B2 | 5/2015 | Zhang et al. | |
| 2004/0025186 A1 | 2/2004 | Jennings et al. | |
| 2007/0275742 A1* | 11/2007 | Zhang | H04L 12/189 455/466 |

(Continued)

OTHER PUBLICATIONS

Office Action dated Jul. 12, 2017 for U.S. Appl. No. 14/825,124, 44 pages.

*Primary Examiner* — Steven H Nguyen
(74) *Attorney, Agent, or Firm* — Amin, Turocy & Watson, LLP

(57) ABSTRACT

Providing integrated LTE-B network and service management is disclosed. Changes to an LTE or LTE-B network can be propagated in real-time, or near-real-time, to a mapping profile representative of the LTE or LTE-B network. This mapping profile can be employed in updating the LTE or LTE-B network. Further, the mapping profile can be employed in establishing a new LTE-B session, adapting an existing LTE-B session, maintaining an existing LTE-B session, etc. Access to a reporting rule can enable the LTE or LTE-B network to proactively report changes to the LTE or LTE-B network. Integrated LTE-B network and service management can be integrated and/or centralized, such as, at a carrier-network, core-component. Moreover, integrated LTE-B network and service management can be virtualized.

20 Claims, 10 Drawing Sheets

(56) References Cited

U.S. PATENT DOCUMENTS

| | | | |
|---|---|---|---|
| 2010/0265867 A1* | 10/2010 | Becker | H04W 72/005 370/312 |
| 2011/0026464 A1 | 2/2011 | Chen et al. | |
| 2011/0032858 A1 | 2/2011 | Lohmar et al. | |
| 2011/0051646 A1 | 3/2011 | Rice | |
| 2012/0039262 A1 | 2/2012 | Walsh | |
| 2012/0155364 A1* | 6/2012 | Kim | H04W 4/06 370/312 |
| 2012/0240167 A1 | 9/2012 | Vasudevan et al. | |
| 2013/0064160 A1 | 3/2013 | Newberg et al. | |
| 2013/0094428 A1 | 4/2013 | Lee | |
| 2013/0104173 A1 | 4/2013 | Tjio et al. | |
| 2013/0138814 A1 | 5/2013 | Kotecha | |
| 2013/0194999 A1 | 8/2013 | Auchan | |
| 2013/0212166 A1* | 8/2013 | Willig | H04L 65/1016 709/203 |
| 2013/0301539 A1* | 11/2013 | Aguirre | H04W 16/00 370/329 |
| 2013/0315125 A1 | 11/2013 | Ravishankar et al. | |
| 2014/0153476 A1 | 6/2014 | Wang et al. | |
| 2014/0204830 A1 | 7/2014 | Wang et al. | |
| 2014/0313974 A1* | 10/2014 | Chandramouli | H04W 4/06 370/328 |
| 2015/0036581 A1 | 2/2015 | Etemad et al. | |
| 2015/0040162 A1* | 2/2015 | Kotecha | H04N 21/2402 725/44 |
| 2015/0124686 A1 | 5/2015 | Zhang | |
| 2015/0163643 A1 | 6/2015 | Slssingar et al. | |
| 2015/0208209 A1 | 7/2015 | Jamadagni et al. | |
| 2015/0236805 A1* | 8/2015 | Mcevilly | H04H 20/72 370/312 |
| 2015/0289232 A1 | 10/2015 | Lohmar et al. | |

\* cited by examiner

NETWORK MANAGEMENT FOR CONTENT BROADCAST

TECHNICAL FIELD

The disclosed subject matter relates to management of a network associated with broadcast of content, e.g., content from a long term evolution (LTE) broadcast (LTE-B) network(s) or enhanced multimedia broadcast multicast service (eMBMS) network(s).

BACKGROUND

By way of brief background, conventional multimedia broadcast multicast service (MBMS) is generally reliant on determining individual bearer paths to carry content from a service to a consuming device. Further, these services are typically implemented in a proprietary and/or standalone manner without coordination between the providers of the MBMS services. The bearer paths are frequently manually updated and often do not reflect up-to-date network topologies, e.g., the proprietary systems fail to effectively learn the dynamics of the radio access and core network elements expansion as well as the resulting network topology changes via conventional interfaces.

DETAILED DESCRIPTION

Figure 1:
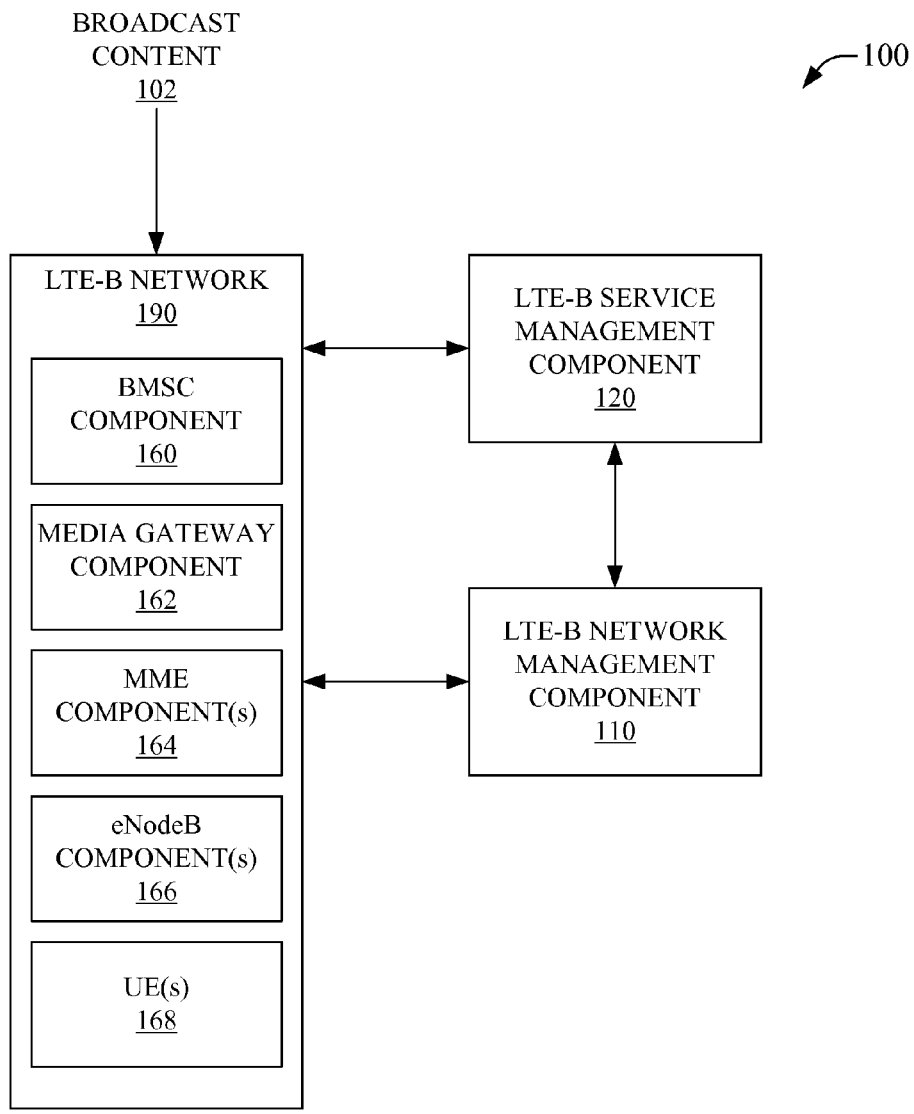
FIG. 1 is an illustration of an example system that facilitates network management for content broadcast in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional multimedia broadcast multicast service (MBMS) can be reliant on determining individual bearer paths to carry content from a service to a consuming device. Further, conventional MBMS techniques, often associated with 3GPP technologies, are being similarly applied in long term evolution (LTE) technologies, e.g., as enhanced MBMS (eMBMS) or LTE-Broadcast (LTE-B), without resolution of the issues that are often associated with the poor deployment of MBMS services. These services, e.g., MBMS and eMBMS, are typically proprietary standalone services lacking coordination between the proprietary providers. MBMS generally lacks automation and, as such, MBMS systems often do not reflect up-to-date network topologies because the proprietary systems fail to learn the dynamics of the radio access and core network elements as well as network topology changes via conventional interfaces. Of note, the term MBMS, eMBMS, and LTE-B, can each generally be used interchangeably in the present disclosure, except where specifically recited to illustrate a distinction from other technologies as will be appreciable to those of skill in the relevant arts.

In contrast to conventional proprietary systems for each content delivery service, unified network management can be implemented, e.g., by a carrier network in core-network components, etc., to better reflect the topology of a network for delivery of content. Unified network management can comprise real-time or near-real-time analysis of a topology of an LTE network associated with broadcasting content to a service area. Moreover, unified network management can employ the analysis of one or more LTE networks, or portions thereof, associated with broadcast delivery to one or more service areas. As such, broadcast content providers can expect that bearer paths to user equipments (UEs) can be kept up to date and can therefore better provide reliable content delivery to one or more UEs in one or more service areas in comparison to conventional techniques. In part, conventional techniques can fail due to the complex mesh of network devices that can provide broadcast content delivery to a service area and the dynamic nature of these complex networks, for example, in self-organizing networks, especially those comprising small cell eNodeBs (eNBs), Wi-Fi access points (APs), etc., the devices comprising the network can be in nearly constant flux in some service areas, such as when mobile devices that are moving are also acting as APs. Where broadcast content delivery systems are not updated frequently enough as to changes in the devices comprising the delivery network, there can be significant failures to actually deliver broadcast content, e.g., routing data to edge devices that have left a service area, edge devices that are highly burdened, edge devices that are off-line, etc. A benefit of unified network management is that it can, in some embodiments be tightly integrated to topology reporting, e.g., subject to topology reporting rules, in close communication with LTE network management systems, having carrier-level access to LTE-B network components such as broadcast/multicast service center (BMSC) components, media gateway (MGW) components, mobility management entity (MME) components, eNBs, and even to UEs on a carrier-network.

In an aspect, carrier networks can enable a centralized LTE-B core network architecture design, wherein, for example, a BMSC component and a MGW component can be connected in a paired mode to connect to incumbent MME regional pools, e.g., one or more MME component, serving one or more LTE radio access network (RAN) nodes to facilitate provision of high-speed mobility services comprising .broadcast content. While not all MME components within a regional pool, or across one or more regional pools, and their respective serving RAN nodes may be eMBMS enabled during the initial broadcast service deployment phase, legacy MBMS service can be integrated into LTE-B service architectures to allow broadcast of content to network areas served by current and legacy technologies. A BMSC component can be provisioned and managed by a single service platform, or multiple platforms in other embodiments, that can be independent from a regional network management platform that manages the rest of the LTE-B network elements (including eNB, MME, MGW, S/P-GW, etc.). In an aspect, a service platform and a regional network management system(s) can be aware of an underlying network topology design via configuration management synchronization. Access to the BMSC component to enable broadcast content delivery can be made available to content providers while management of the LTE-B network can be provided as a service by a carrier associated with the carrier-network LTE components.

A regional network management system can manage the MGW, MME region, and associated serving eNBs, to build a MBMS service configuration management profile, e.g., embedded within a portal, that can enable reporting of topology related information to the BMSC such that the BMSC can be aware of the downstream network topology when establishing MBMS sessions. Moreover, the regional network management system can manage these components for one or more BMSCs and/or one or more service areas associated with the one or more BMSCs. In view of the BMSC being managed by a service management platform, it can derive the MGW Hostname, Destination Realm MME Interface IP addressing, service area identification (SAI), etc., to be able to successfully setup a MBMS sessions with appropriate downstream nodes. In some embodiments, regional systems can provide updated network constructs in real-time, or near-real-time, to the service management platform for it to build a unified overall topology view of the network in real-time or near-real-time. Changes in nodal configuration, construction of a MBMS mapping profile, and making the mapping profile available to a BMSC service platform can therefore also be done in in real-time or near-real-time. The service provisioning platform can in turn update the MBMS mapping profile within the BMSC so that it can establish new sessions due to topology changes while simultaneously maintaining other ongoing sessions and MBMS bearer contexts in a manner that adapts to changes in the LTE-B network topology.

In an aspect, LTE-B architecture as disclosed herein can be utilized for effective broadcast content delivery, e.g., video services delivery, etc., over the same LTE infrastructure network while preserving scarce spectrum resources. In an aspect, emergency broadcasts that span across the entire MBMS coverage area, e.g., SAI=0, the updated network topology within the herein disclosed BMSC can help to ensure that all downstream nodes participating in the LTE-B are able to establish an MBMS session successfully towards the eNBs so as to receive the emergency broadcast content. In another aspect, for a single BMSC-MGW design serving multiple regional MME pools, the BMSC-MGW-MME connectivity and network topology discovery can facilitate an accurate mapping profile defined in the BMSC such that the MBMS session establishments affect traditional LTE mobility services such as data, voice over LTE (VoLTE), E911 etc., served by the MME regional pools, less adversely than they might otherwise be. Additionally, in some embodiments, regional network management systems can be synchronized when reporting their respective MBMS mapping profiles to a centralized service management platform that can then use that mapping to provision the integrated MBMS profile within the BMSC.

The presently disclosed subject matter also illustrates, in some embodiments, a proactive approach in reporting such network configuration dynamics to a service management platform over, such as a standardized interface like NETCONF/YANG, using a common message format, e.g., XML, these systems can apply topology reporting rules that can lead to increased certainty as to the accuracy of a mapping profile in comparison to the service platform trying to extract that information from each of the regional network management systems that can be associated with delay, errors, and failures to report for a myriad of reasons, such as high latency, lost packets, etc. Moreover, auditing can be employed to provide a feedback mechanism to improve capturing of network dynamics via the disclosed mapping of the network topology.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates network management for content broadcast in accordance with aspects of the subject disclosure. System 100 can comprise LTE-B network management component 110. LTE-B network management component 110 can send and receive information with LTE-B network 190 or components thereof. In an aspect, LTE-B network management component 110 can receive information related to the state of LTE-B network 190. This information can comprise topology information, provisioning information, fault information, performance information, traffic information, resource(s) utilization information, historical information, etc. As an example, LTE-B network management component 110 can receive information relating to the topology of LTE-B network 190 and information indicating SAI(s) having some coverage via edge devices of LTE-B network 190, e.g., eNB(s) coverage areas. As another example, LTE-B network management component 110 can receive information indicating that a MME component 164 is scheduled to be offline for service/repair at a future date/time, such that this information can be employed in determining a topology mapping profile associated with said date/time that reflects a lower ranking of the MME component 164 and a higher ranking for other MME components 164 to maintain broadcast coverage to service areas that would normally be served by the MME component 164 expected to be offline. As a further example, LTE-B network management component 110 can receive information indicating that an eNB component 166 is highly burdened such that an alternative eNB 166 can be selected, e.g., via a mapping profile, to enable establishment of a new MBMS session or maintenance or an existing MBMS session in the service area of the burdened eNB 166, e.g., traffic balancing and load shifting can be enabled for LTE-B. As a still further example, newly added, or deleted, smallcells (not illustrated, e.g., femtocells, picocells, etc.) can be reflected in a topology map wherein information related to the addition or removal of the smallcells is received from LTE-B network 190 by LTE-B network management component 110.

In some embodiments, LTE-B network management component 110 can be comprised in a carrier network corenetwork. Whereas a carrier-network operating an LTE network has ready access to the types of information disclosed herein, this information can be communicated to LTE-B network management component 110 by core-network components of the carrier network. This can aid the carrier associated with the carrier network to act as a service provider to content broadcasters by providing broadcasters access to an integrated network and service management layer, e.g., the broadcaster can provide service information to the integrated network and service management layer which can then establish a session(s) on behalf of the broadcaster allowing content to be broadcast to a UE without the broadcaster needing to directly manage network component routing.

LTE-B network management component 110 can also communicate information to LTE-B network 190 and/or components thereof. In an aspect, LTE-B network management component 110 can adapt the configuration of LTE-B network 190. In an embodiment LTE-B network management component 110 can manage LTE-B network 190 in response to information received by LTE-B network management component 110 from LTE-B network 190. As an example, LTE-B network management component 110 can direct alterations to the topology of LTE-B network 190 to, for example, move UE 168 sessions from a first burdened eNB to another less burdened eNB in response to receiving information from LTE-B network 190 that the first eNB is burdened. As another example, LTE-B network management component 110 can restrict eMBMS through a newly added network edge device, e.g., a newly added Wi-Fi AP, etc., until a history of effective service has been established. As a further example, LTE-B network management component 110 can restrict eMBMS through a network edge device, e.g., a smallcell, etc., based on historical information reflecting spotty eMBMS service, in some instances, LTE-B network management component 110 can remove a spotty edge device from the LTE-B network, although it may remain in an LTE network for purposes other than MBMS content broadcasts.

LTE-B network management component 110 can be communicatively coupled to LTE-B service management component 120. LTE-B service management component 120 can receive information from LTE-B network management component 110. In an embodiment, this information can include topology information related to LTE-B network 190. In an aspect, the topology information can be simply passed through LTE-B network management component 110 to LTE-B service management component 120 without alteration, e.g., for analysis at LTE-B service management component 120. In another aspect, LTE-B network management component 110 can perform analysis of, and/or operations of information received from LTE-B network 190 to provide a mapping profile of LTE-B network 190, which, in some instances can reflect the real-time, or near-real-time, state of LTE-B network 190.

LTE-B service management component 120 can determine establishment of LTE-B sessions based on the information received from LTE-B network management component 110. In some embodiments, additional information can also be included in demining LTE-B session establishment, provisioning, maintenance/updating of existing sessions, etc. As an example, LTE-B service management component 120 can receive broadcast content 102, e.g., via LTE-B network 190 as illustrated, by a split feed (not illustrated), etc., and can analyze broadcast content 102 for compliance with one or more rules. These rules can relate to encoding, resolution, content restrictions, content classification and/or prioritization, content duration, rights to broadcast the content, or nearly any other aspect related to the content. In an example, broadcast content 102 can be determined, by LTE-B service management component 120, to comprise copyrighted material without a license or permission to broadcast the copyrighted material, whereby LTE-B service management component 120 can restrict establishing LTE-B sessions in accord with reducing piracy of content. In a further example, objectionable or illegal content can be restricted, e.g., child pornography, dissemination of classified materials, etc. In another example, LTE-B service management component 120 can determine what regions are allowed access to broadcast content 102 and can adapt LTE-B sessions accordingly. In a further example, based on LTE-B network 190 topology map received from LTE-B network management component 110 and information related to broadcast content 102, LTE-B sessions can be adapted to increase the quality of delivered content in underutilized LTE-B networks or to restrict the quality of delivered content in burdened LTE-B networks, in accord with customer agreements for both the provider of the broadcast content 102 and the customers associated with UE(s) 168, e.g., via customer profile information communicated to LTE-B service management component 120, etc.

As LTE-B networks, e.g., 190, etc., become more ubiquitous and of increasing complexity, management of the LTE-B network, e.g., by LTE-B network management component 110, and of the LTE-B services, e.g., by LTE-B service management component 120, becomes increasingly relevant in contrast to conventional techniques that are generally proprietary. As an example, conventional techniques of MBMS can result in numerous vertically integrated broadcast services that each require separate maintenance and updating, which can actually increase backend traffic associated with the LTE-B network, e.g., 190, receiving requests for topology information from numerous broadcast services, replying to each of those proprietary broadcast services, and little ability to adapt the LTE-B network itself, e.g., 190, in response to competing requests from the plurality of broadcast services. In contrast, the presently disclosed subject matter provides for a common point of entry into an LTE-B network, e.g., 190, for a plurality of broadcast services, wherein the maintenance and management of the LTE-B network is not performed by numerous competing broadcast services. Moreover, content itself can play a role in MBMS session establishment or maintenance, allowing for effective quality control with regard to the broadcast content, e.g., 102. This can aid in effective dissemination of the broadcast content that accords with the condition of the LTE-B network, e.g., 190, as well as customer agreements, service provider agreements, etc., piracy protection, restrictions based on the subject matter of the broadcast content, e.g., illegal and/or immoral materials, etc.

In some embodiments, components of system 100 can be tightly integrated into systems associated with the control and management of an LTE network, e.g., carrier network core-components. Given that carriers already manage LTE networks, it can readily be appreciated that management of LTE-B networks and service is highly complementary. Moreover, carriers can virtualize components into their core-networks allowing for highly flexible deployments, such as providing mobile virtual network operators (MVNOs) to deploy separate instances of an LTE-B service that can be tailored to the MVNO while still remaining responsive to LTE-B network analysis, network management, service management, etc.

In some embodiments, multiple broadcast content providers can introduce content, e.g., 102, to LTE-B network 190 in conjunction with management of the LTE-B network, e.g., by LTE-B network management component 110, and management of the LTE-B services, e.g., by LTE-B service management component 120. The several content packages, or streams, can be routed to the correct service areas for each stream in a manner that is typically more efficient and more fault tolerant than several discrete proprietary MBMS providers. In an aspect, LTE-B service management component 120 can receive LTE-B network 190 management information from LTE-B network management component 110, and can then facilitate establishment of new sessions or updating existing sessions based on the information received from LTE-B network management component 110 in view of the several individual content streams. This clearly reduces the redundancy of components associated with deploying multiple proprietary systems on top of an LTE network in an effort to accomplish similar results.

Figure 2:
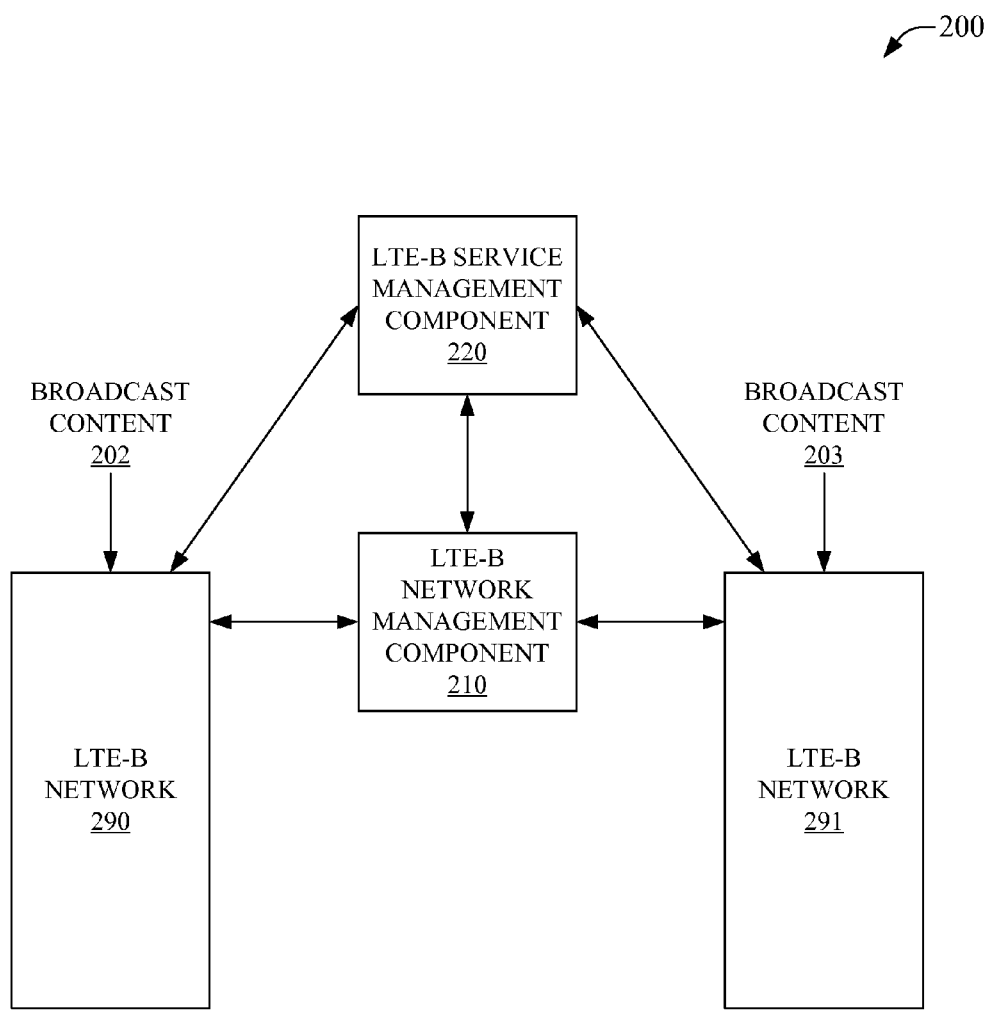
FIG. 2 is a depiction of an example system that facilitates network management for content broadcast for multiple broadcast service areas in accordance with aspects of the subject disclosure.

FIG. 2 is a depiction of a system 200 that can facilitate network management for content broadcast for multiple broadcast service areas in accordance with aspects of the subject disclosure. System 200 can comprise LTE-B network management component 210. LTE-B network management component 210 can send and receive information with LTE-B network 290 and/or 291, or components thereof. In an aspect, LTE-B network management component 210 can receive information related to the state of LTE-B networks 290 and 291. This information can comprise topology information, provisioning information, performance information, traffic information, utilization information, historical information, etc., for the respective LTE-B networks, e.g., 290 or 291. As an example, LTE-B network management component 210 can receive information relating to the topology of LTE-B network 290 and similarly receive information indicating SAI(s) having some coverage via edge devices of LTE-B network 291, e.g., eNB(s) coverage areas. As a further example, newly added, or deleted, smallcells (not illustrated) can be reflected in one or more topology maps wherein information related to the addition or removal of the smallcells is received from LTE-B network 290 and/or LTE-B network 291 by LTE-B network management component 210.

In some embodiments, LTE-B network management component 210 can be comprised in a carrier network core-network. Whereas a carrier-network operating an LTE network can have ready access to the types of information disclosed herein, this information can be communicated to LTE-B network management component 210 by core-network components of the carrier network, e.g., in lieu of receiving said information directly from LTE-B network 290 or 291. This can aid the carrier associated with the carrier network in acting as a service provider to content broadcasters by providing broadcasters access to an integrated network and service management layer, e.g., the broadcaster can provide service information to the integrated network and service management layer which can then establish a session(s) on behalf of the broadcaster allowing content to be broadcast to a UE without the broadcaster needing to directly manage network component routing.

LTE-B network management component 210 can also communicate information to LTE-B network(s) 290 and/or 291, and components thereof. In an aspect, LTE-B network management component 210 can adapt the configuration of LTE-B network 290 and/or LTE-B network 291. In an embodiment LTE-B network management component 210 can manage LTE-B network 290 in response to information received by LTE-B network management component 210 from LTE-B network 290 and simultaneously manage LTE-B network 291 in response to information received by LTE-B network management component 210 from LTE-B network 291.

LTE-B network management component 210 can be communicatively coupled to LTE-B service management component 220. LTE-B service management component 220 can receive information from LTE-B network management component 210. In an embodiment, this information can include topology information related to LTE-B network 290. In an aspect, the topology information can be simply passed through LTE-B network management component 210 to LTE-B service management component 220 without alteration, e.g., for analysis at LTE-B service management component 220. In another aspect, LTE-B network management component 210 can perform analysis of, and/or operations on information received from LTE-B network 290 and/or 291 to provide a mapping profile of LTE-B network 290 and/or 291 respectively, which, in some instances can reflect the real-time, or near-real-time, state of LTE-B network 290. In some embodiments, LTE-B network management component 210 can perform analysis of, and/or operations on information received from LTE-B network 290 and 291 to provide a mapping profile of LTE-B network 290 and 291 as a unified map, rather than as separate maps. LTE-B service management component 220 can also receive information from LTE-B networks 290 and/or 291.

LTE-B service management component 220 can determine establishment of LTE-B sessions based on the information received from LTE-B network management component 210. In some embodiments, additional information can also be included in demining LTE-B session establishment, provisioning, maintenance/updating of existing sessions, etc. As an example, LTE-B service management component 220 can receive broadcast content 202, 203, etc., e.g., via LTE-B network 290 and/or 291 as illustrated, by a split feed (not illustrated), etc., and can analyze broadcast content 202, 203, etc., for compliance with one or more rules. These rules can relate to encoding, resolution, content restrictions, content classification and/or prioritization, content duration, rights to broadcast the content, or nearly any other aspect related to the content. In an example, broadcast content 202 can be determined, by LTE-B service management component 220, to comprise copyrighted material without a license or permission to broadcast the copyrighted material, whereby LTE-B service management component 220 can restrict establishing LTE-B sessions in accord with reducing piracy of content, while simultaneously allowing establishment of sessions for broadcast content 203. In an embodiment, system 200 can provide for broadcast of broadcast content 202 via LTE-B network 291 and correspondingly can enable broadcast of broadcast content 203 via LTE-B network 290. This can be accomplished by routing content between LTE-B networks, e.g., 290 and 291. In other embodiments, broadcast content 202 and 203 can be restricted to either LTE-B network 290 or 291. As an example, while broadcast content 202 is illustrated as being introduced to LTE-B network 290, broadcast content 202 can be routed to LTE-B network 291 such that broadcast content 202 and 203 are both broadcast through LTE-B network 291 and neither is broadcast through LTE-B network 290. This illustrates the highly adaptive nature of employing a centralized LTE-B network and service management architecture that would typically not be attainable in conventional systems that employ individual proprietary LTE-B broadcast networks.

As LTE-B networks, e.g., 290, 291, etc., become more ubiquitous and of increasing complexity, management of the LTE-B network, e.g., by LTE-B network management component 210, and of the LTE-B services, e.g., by LTE-B service management component 220, becomes increasingly relevant in contrast to conventional techniques that are generally proprietary. As an example, conventional techniques of MBMS can result in numerous vertically integrated broadcast services that each require separate maintenance and updating, which can actually increase backend traffic associated with the LTE-B network, e.g., 290, 291, etc., receiving requests for topology information from numerous broadcast services, replying to each of those proprietary broadcast services, and little ability to adapt the LTE-B network itself, e.g., 290, 291, etc., in response to competing requests from the plurality of broadcast services. In contrast, the presently disclosed subject matter provides for one or more common points of entry into one or more LTE-B networks, e.g., 290, 291, etc., for a plurality of broadcast services, wherein the maintenance and management of the LTE-B network is not performed by numerous competing broadcast services. Moreover, content itself can play a role in MBMS session establishment or maintenance, allowing for effective quality control with regard to the broadcast content, e.g., 202, 203, etc. This can aid in effective dissemination of the broadcast content that accords with the condition of an LTE-B network, e.g., 290, 291, etc., as well as customer agreements, service provider agreements, etc., piracy protection, restrictions based on the subject matter of the broadcast content, e.g., illegal and/or immoral materials, etc.

In some embodiments, components of system 200 can be tightly integrated into systems associated with the control and management of an LTE network, e.g., carrier network core-components. Given that carriers generally already manage one or more LTE networks, it can readily be appreciated that management of LTE-B networks, e.g., 290, 291, etc., and broadcast content service(s) is highly complementary. Moreover, carriers can virtualize components into their core-networks allowing for highly flexible deployments while still remaining responsive to LTE-B network analysis, network management, service management, etc.

In some embodiments, multiple broadcast content providers can introduce content, e.g., 202, 203, etc., to LTE-B network(s) 290, 291, etc., in conjunction with management of the LTE-B network, e.g., by LTE-B network management component 210, and management of the LTE-B services, e.g., by LTE-B service management component 220. The several content packages, or streams, e.g., those comprised in each of 202, 203, etc., can be routed to the correct service areas for each stream in a manner that is typically more efficient and more fault tolerant than several discrete proprietary MBMS providers. In an aspect, LTE-B service management component 220 can receive LTE-B network 290, 291, etc., management information from LTE-B network management component 210, and can then facilitate establishment of new sessions or updating existing sessions based on the information received from LTE-B network management component 210 in view of the several individual content streams across broadcast content(s) 202, 203, etc. This can reduce the redundancy of components associated with deploying multiple proprietary systems on top of an LTE network in an effort to accomplish similar results.

Figure 3:
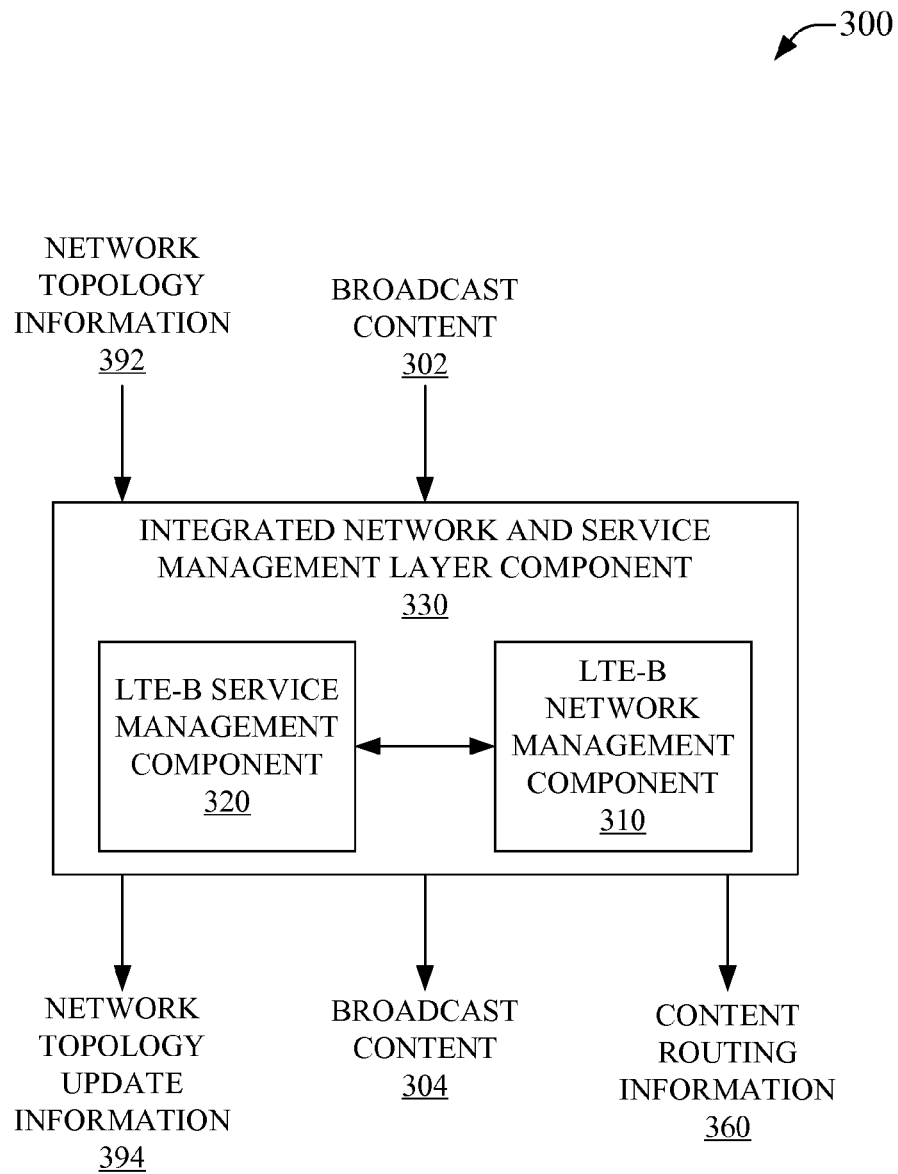
FIG. 3 illustrates an example system that facilitates network management for content broadcast via an integrated network and service management layer in accordance with aspects of the subject disclosure.

FIG. 3 illustrates a system 300 that facilitates network management for content broadcast via an integrated network and service management layer in accordance with aspects of the subject disclosure. System 300 can comprise integrated network and service management layer component 330. Integrated network and service management layer component 330 can further comprise LTE-B network management component 310 and LTE-B service management component 320. Integrated network and service management layer component 330 can therefore send and receive information with an LTE-B network, or components thereof, e.g., network topology information 392, etc. In an aspect, integrated network and service management layer component 330 can receive information related to the state of one or more LTE-B network. This information can comprise topology information, provisioning information, performance information, traffic information, utilization information, historical information, etc., as disclosed herein in conjunction with LTE-B network management component 310, etc.

In some embodiments, integrated network and service management layer component 330 can also communicate information to one or more LTE-B networks and/or components thereof, etc., e.g., network topology update information 394, content routing information 360, broadcast content 304, etc. This can facilitate adapting a configuration of an LTE-B network. In an embodiment, integrated network and service management layer component 330 can manage an LTE-B network in response to information received by integrated network and service management layer component 330 from said LTE-B network, etc.

In some embodiments, integrated network and service management layer component 330 can perform analysis of, and/or operations on network information to provide a mapping profile of one or more LTE-B networks, which, in some instances can reflect the real-time, or near-real-time, state of an LTE-B network. In some embodiments, integrated network and service management layer component 330 can perform analysis of information received from a plurality of LTE-B networks to provide a unified mapping profile, rather than as separate mapping profiles for the several LTE-B networks.

In an aspect, integrated network and service management layer component 330 can determine establishment of LTE-B sessions based on the information received from one or more LTE-B networks. In some embodiments, additional information can also be included in determining LTE-B session establishment, provisioning, maintenance/updating of existing sessions, etc. As an example, integrated network and service management layer component 330 can receive broadcast content 302, etc., and can analyze broadcast content 302, etc., for compliance with one or more rules. These rules can relate to encoding, resolution, content restrictions, content classification, rights to broadcast the content, or nearly any other aspect related to the content. In an embodiment, system 300 can provide for broadcast of broadcast content 302 via one or more LTE-B networks simultaneously. This can be accomplished by routing content between LTE-B networks. This illustrates an aspect of the highly adaptive nature of employing a centralized LTE-B network and service management architecture that would typically not be attainable in conventional systems that employ individual proprietary LTE-B broadcast networks.

Integrated network and service management layer component 330 can be comprised in a carrier network core-network. Whereas a carrier-network operating an LTE network can have ready access to the types of information disclosed herein, this information can be communicated to integrated network and service management layer component 330 by core-network components of the carrier network, e.g., in lieu of receiving said information directly from an LTE-B network. This can aid the carrier associated with the carrier network in acting as a service provider to content broadcasters by providing broadcasters access to an integrated network and service management layer, e.g., the broadcaster can provide service information to the integrated network and service management layer which can then establish a session(s) on behalf of the broadcaster allowing content to be broadcast to a UE without the broadcaster needing to directly manage network component routing. In some embodiments, components of system 300 can be tightly integrated into systems associated with the control and management of an LTE network, e.g., carrier network core-components. Given that carriers generally already manage one or more LTE networks, it can readily be appreciated that management of LTE-B networks and broadcast content service(s) is highly complementary. Moreover, carriers can virtualize components into their core-networks allowing for highly flexible deployments while still remaining responsive to LTE-B network analysis, network management, service management, etc.

In some embodiments, multiple broadcast content providers can introduce content, e.g., broadcast content 302, etc., to integrated network and service management layer component 330 and, in conjunction with management of the LTE-B network, e.g., by LTE-B network management component 310, and management of the LTE-B services, e.g., by LTE-B service management component 330, this content can then be passed to one or more LTE-B networks, e.g., as broadcast content 304. In an aspect, broadcast content 302 can be the same as broadcast content 304. In other aspect, integrated network and service management layer component 330 can alter, delay, or otherwise modify broadcast content 302 into broadcast content 304. As an example, content that does not satisfy content rules can be removed, content can be transcoded, content can be throttled or have the quality altered, content can be supplemented, etc.

Figure 4:
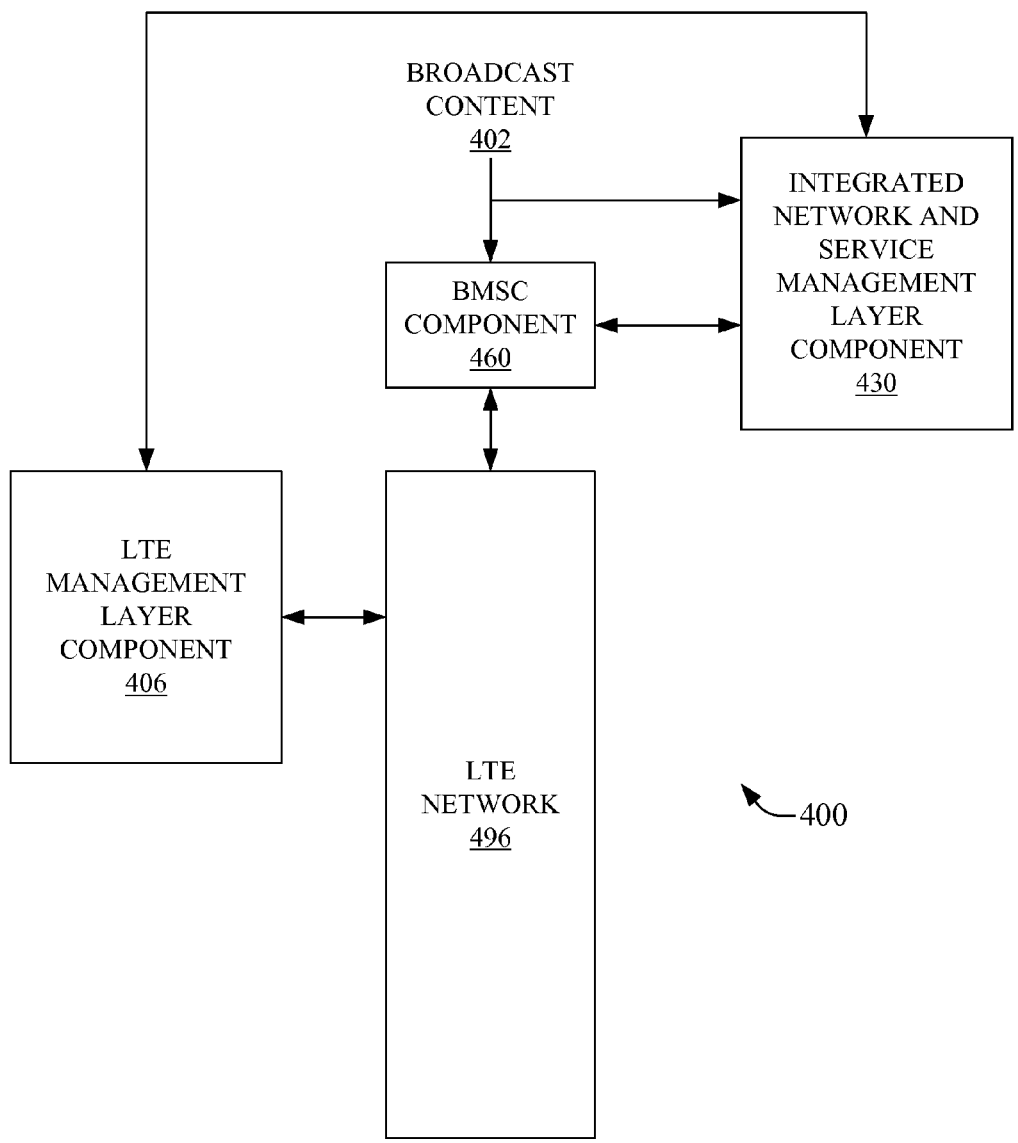
FIG. 4 illustrates an example system that facilitates network management for content broadcast via data exchange with an LTE management system in accordance with aspects of the subject disclosure.

FIG. 4 illustrates a system 400 that facilitates network management for content broadcast via data exchange with an LTE management system in accordance with aspects of the subject disclosure. System 400 can comprise integrated network and service management layer component 430. In some embodiments, integrated network and service management layer component 430 can further comprise LTE-B network management component and LTE-B service management component, not illustrated for brevity and clarity. Integrated network and service management layer component 430 can send and receive information with an LTE management layer component 406 that can in turn send and receive information with an LTE network 496, or components thereof, e.g., network topology information 492, etc. In an aspect, integrated network and service management layer component 430 can receive information related to the state of one or more LTE network. This LTE network information can comprise topology information, provisioning information, performance information, traffic information, utilization information, historical information. In an aspect, LTE network 496 coupled with BMSC component 460 can act as an LTE-B network as disclosed elsewhere herein, however system 400 illustrates them as separated to emphasize that an LTE network, e.g., 496, etc., as can readily be found in many carrier-network systems, can function as an LTE-B network with the addition of a BMSC component, e.g., 460, or other similar functionality embodied in other components. In some embodiments, integrated network and service management layer component 430 can also communicate information to one or more LTE networks and/or components thereof, etc., non-illustrated for clarity and brevity. Access to LTE network information can facilitate adapting the LTE network, e.g., 496, etc., directly (not illustrated) or via LTE management layer component 406.

In some embodiments, integrated network and service management layer component 430 can perform analysis of, and/or operations on network information to provide a mapping profile of one or more functional LTE-B networks, e.g., LTE network 496 coupled to BMSC component 460, which, in some instances can reflect the real-time, or near-real-time, state of a functional LTE-B network. In some embodiments, integrated network and service management layer component 430 can perform analysis of information received from a plurality of LTE networks, e.g., 496, etc., to provide a unified mapping profile, rather than as separate mapping profiles.

In an aspect, integrated network and service management layer component 430 can determine establishment of functional LTE-B sessions, e.g., those established on BMSC component 460 and LTE network 496, etc., based on the information received from one or more LTE-B networks. In some embodiments, additional information can also be included in determining LTE-B session establishment, provisioning, maintenance/updating of existing sessions, etc. As an example, integrated network and service management layer component 430 can receive broadcast content 402, etc., and can analyze broadcast content 402, etc., for compliance with one or more rules. These rules can relate to encoding, resolution, content restrictions, content classification and/or prioritization, content duration, rights to broadcast the content, or nearly any other aspect related to the content. In an embodiment, system 400 can provide for broadcast of broadcast content 402 via one or more functional LTE-B networks simultaneously. This can be accomplished by routing content between functional LTE-B networks, e.g., an LTE network coupled to BMSC component 460.

In some embodiments, integrated network and service management layer component 430 can be comprised in a carrier network core-network. Whereas a carrier-network operating an LTE network, e.g., 496 via LTE management layer component 406, can have ready access to the types of information disclosed herein, this information can be communicated to integrated network and service management layer component 430 by core-network components of the carrier network, e.g., LTE management layer component 406. This can aid the carrier in acting as a service provider to content broadcasters by providing broadcasters access to an integrated network and service management layer, e.g., the broadcaster can provide service information to the integrated network and service management layer which can then establish a session(s) on behalf of the broadcaster allowing content to be broadcast to a UE without the broadcaster needing to directly manage network component routing. In some embodiments, components of system 400 can be tightly integrated into systems associated with the control and management of an LTE network, e.g., LTE management layer component 406, etc. Given that carriers generally already manage one or more LTE networks, it can readily be appreciated that management of functional LTE-B networks and broadcast content service(s) is complementary. Moreover, carriers can virtualize components into their core-networks allowing for highly flexible deployments while remaining responsive to LTE-B network-type analysis, network management, service management, etc. In some embodiments, multiple broadcast content providers can introduce content, e.g., broadcast content 402, etc., to integrated network and service management layer component 430 and, in conjunction with management of the functional LTE-B network, this content can then be passed to one or more LTE-B networks.

Figure 5:
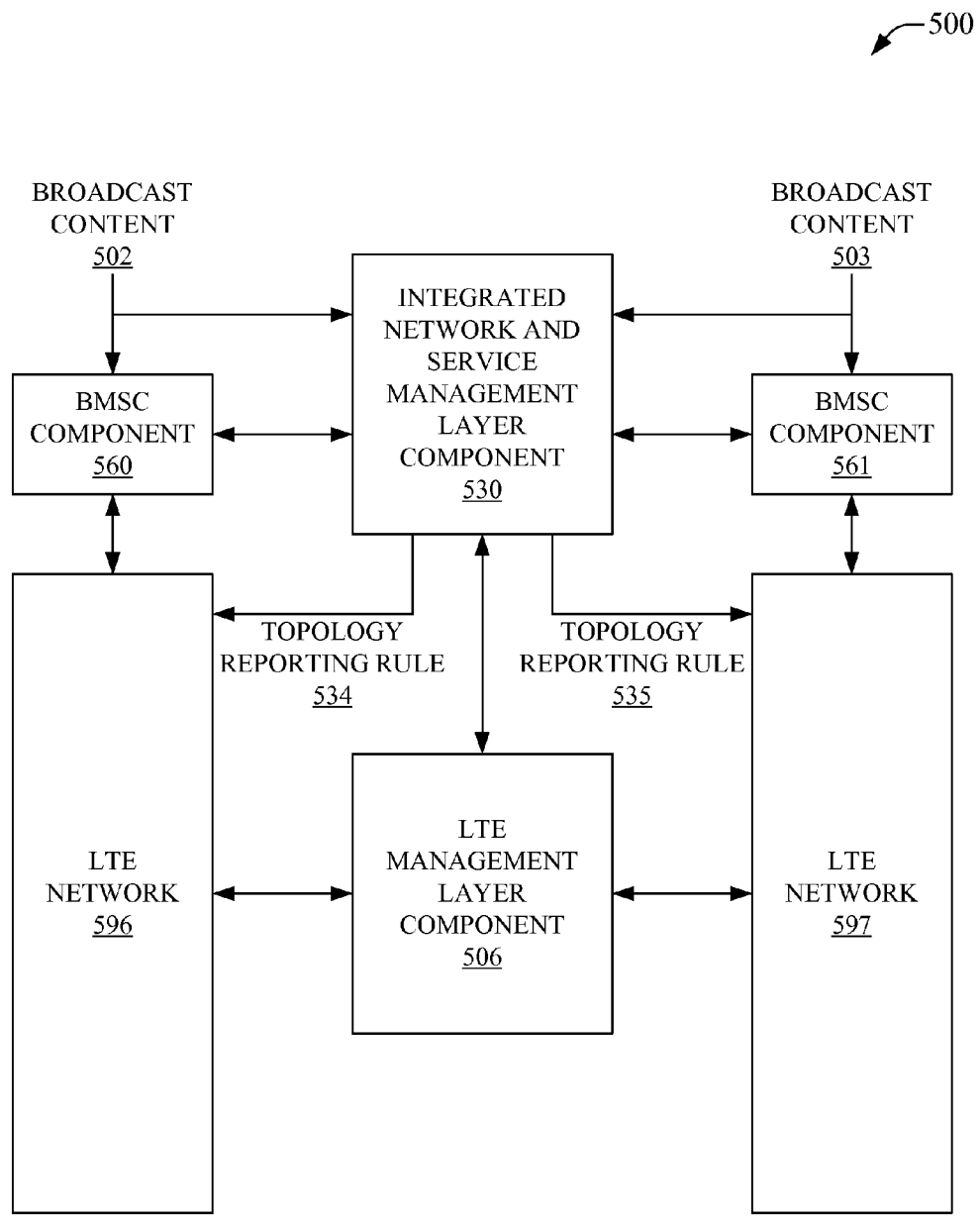
FIG. 5 illustrates an example system facilitating network management for content broadcast for a plurality of LTE service areas with topology reporting rules in accordance with aspects of the subject disclosure.

FIG. 5 illustrates a system 500 that facilitates network management for content broadcast for a plurality of LTE service areas with topology reporting rules in accordance with aspects of the subject disclosure. System 500 can comprise integrated network and service management layer component 530. In some embodiments, integrated network and service management layer component 530 can further comprise LTE-B network management component and LTE-B service management component, not illustrated for brevity and clarity. Integrated network and service management layer component 530 can send and receive information with one or more LTE management layer components, e.g., 506, etc., that can in turn send and receive information with one or more LTE networks 596, 597, etc., or components thereof. In an aspect, integrated network and service management layer component 530 can receive information related to the state of one or more LTE networks, e.g., 596, 597, etc. This LTE network information can comprise topology information, provisioning information, performance information, traffic information, utilization information, historical information. In an aspect, LTE network 596 coupled with BMSC component 560 can act as an LTE-B network as disclosed elsewhere herein, and similarly, LTE network 597 coupled with BMSC component 561 can act as another LTE-B network. In some embodiments, integrated network and service management layer component 530 can also communicate information to one or more LTE networks and/or components thereof. Access to LTE network information can facilitate adapting an LTE network, e.g., 596, 597, etc.

In some embodiments, integrated network and service management layer component 530 can perform analysis of, and/or operations on network information to provide one or more mapping profiles of one or more functional LTE-B networks, e.g., LTE network 596 coupled to BMSC component 560, LTE network 597 coupled to BMSC component 561, etc., which, in some instances can reflect the real-time, or near-real-time, state of a functional LTE-B network. In some embodiments, integrated network and service management layer component 530 can perform analysis of information received from a plurality of LTE networks, e.g., 596, 597, etc., to provide a unified mapping profile, rather than as separate mapping profiles.

In an aspect, integrated network and service management layer component 530 can determine establishment of functional LTE-B sessions, e.g., those established on BMSC component 560 and LTE network 596, LTE network 597 coupled to BMSC component 561, etc., based on the information received from one or more LTE-B networks. In certain instances, BMSC component 560 can further substitute for BMSC 561 with regard to forming a functional LTE-B network with LTE network 597. In some embodiments, additional information can also be included in determining LTE-B session establishment, provisioning, maintenance/updating of existing sessions, etc. As an example, integrated network and service management layer component 530 can receive broadcast content 502, 503, etc., and can analyze broadcast content 502, 503, etc., for compliance with one or more rules. These rules can relate to encoding, resolution, content restrictions, content classification and/or prioritization, content duration, rights to broadcast the content, or nearly any other aspect related to the content. In an embodiment, system 500 can provide for broadcast of broadcast content 502, 503, etc., via one or more functional LTE-B networks simultaneously. This can be accomplished by routing content between functional LTE-B networks, e.g., LTE network 596, 597, etc., coupled to BMSC component 560, LTE network 596, 597, etc., coupled to BMSC component 561, etc.

In some embodiments, integrated network and service management layer component 530 can be comprised in a carrier network core-network. Whereas a carrier-network operating an LTE network, e.g., 596, 597, etc., via LTE management layer component 506, can have ready access to the types of information disclosed herein, this information can be communicated to integrated network and service management layer component 530 by core-network components of the carrier network, e.g., LTE management layer component 506. This can aid the carrier in acting as a service provider to content broadcasters by providing broadcasters access to an integrated network and service management layer, e.g., the broadcaster can provide service information to the integrated network and service management layer which can then establish a session(s) on behalf of the broadcaster allowing content to be broadcast to a UE without the broadcaster needing to directly manage network component routing. In some embodiments, components of system 500 can be tightly integrated into systems associated with the control and management of an LTE network, e.g., LTE management layer component 506, etc. Given that carriers generally already manage one or more LTE networks, it can readily be appreciated that management of functional LTE-B networks and broadcast content service(s) is complementary. Moreover, carriers can virtualize components into their core-networks allowing for highly flexible deployments while remaining responsive to LTE-B network-type analysis, network management, service management, etc. In some embodiments, multiple broadcast content providers can introduce content, e.g., broadcast content 502, 503, etc., to integrated network and service management layer component 530 and, in conjunction with management of the functional LTE-B network, this content can then be passed to one or more LTE-B networks.

In an aspect, integrated network and service management layer component 530 can further provide topology reporting rule 534, 535, etc., to LTE networks, e.g., 596, 597, etc. This topology reporting rule, e.g., 534, 535, etc., can enable automatic reporting of topology information to integrated network and service management layer component 530 by one or more LTE networks, e.g., 596, 597, etc., or functional LTE-B networks. This can, for example, reduce network traffic associated with actively polling for topology changes by providing a structure, e.g., a rule, under which LTE and/or LTE-B networks can self-monitor and report. In some instances, topology reporting rule 534 can be the same as topology reporting rule 535. In other instances, topology reporting rule 534 can be different from topology reporting rule 535. Moreover, in some embodiments, topology reporting rule 534 can be communicated between LTE network 597 and LTE network 596 via LTE management layer component 506, e.g., integrated network and service management layer component 530 can source a topology reporting rule, which can then propagate to one or more LTE networks, via other components of system 500.

Figure 6:
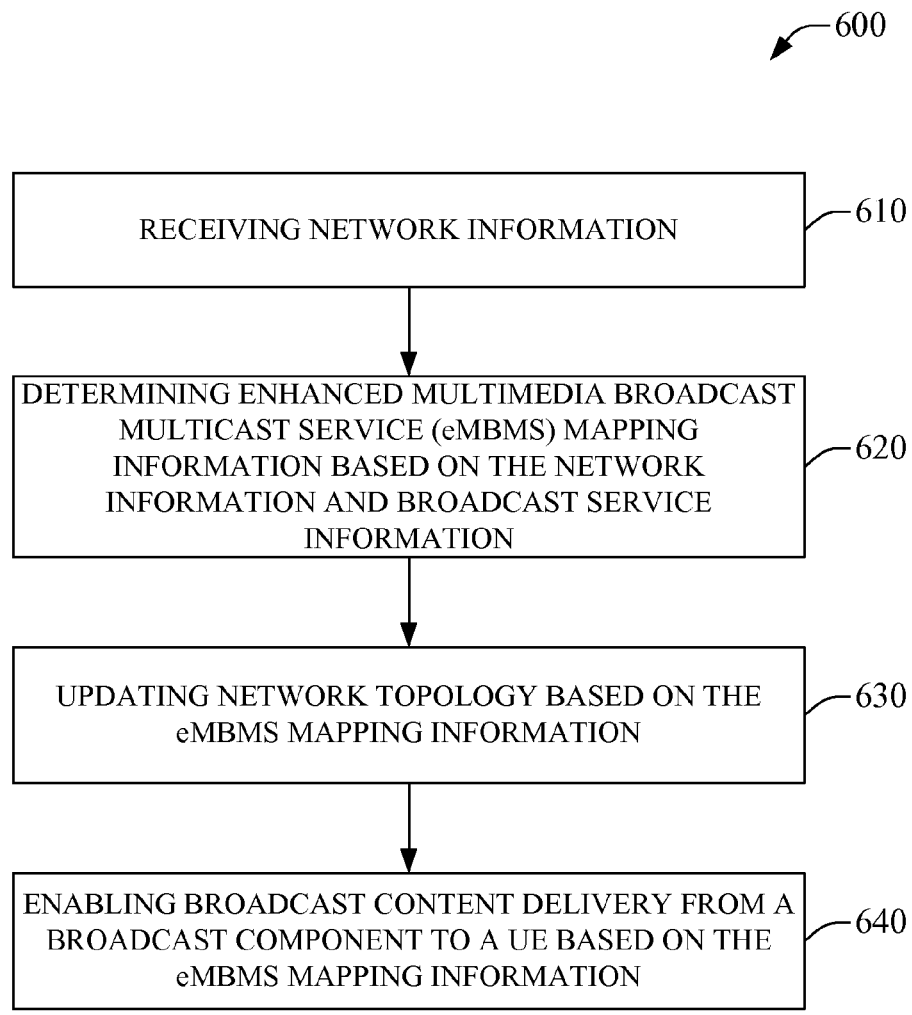
FIG. 6 illustrates an example method facilitating network management for content broadcast in accordance with aspects of the subject disclosure.
Figure 7:
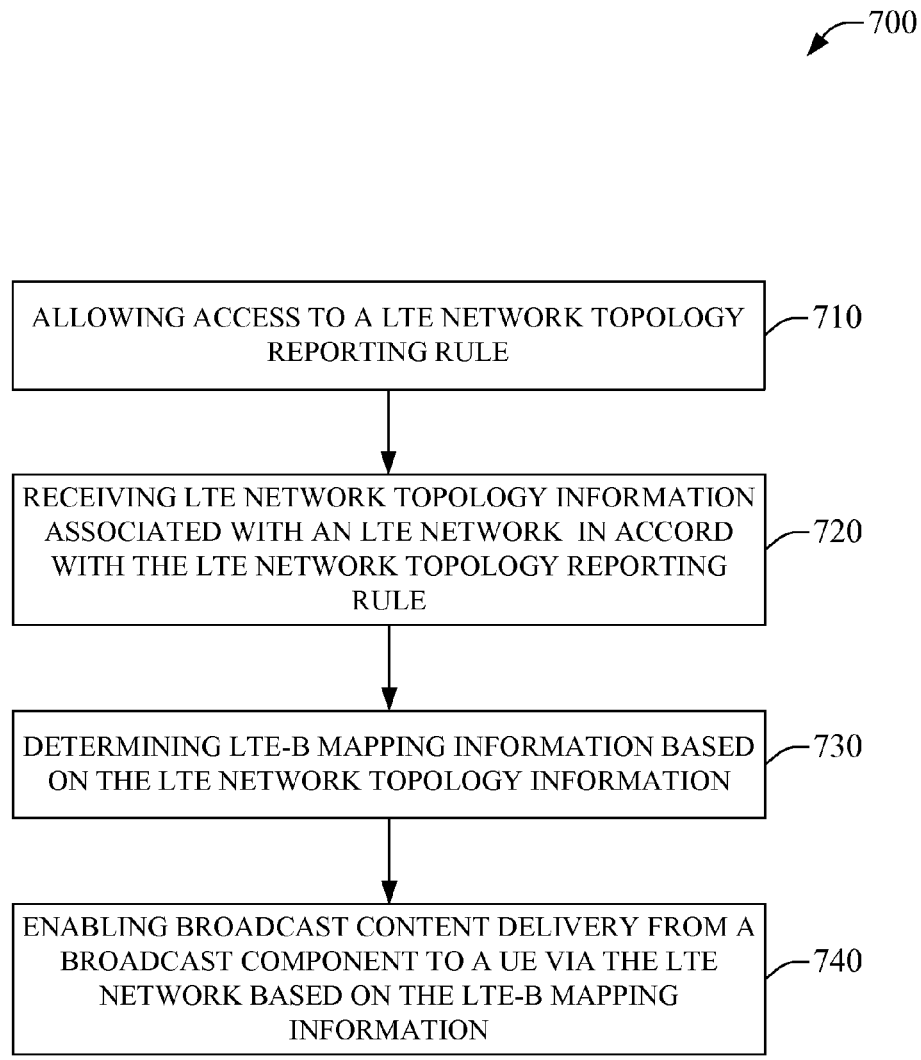
FIG. 7 depicts an example method facilitating network management for content broadcast subject to topology reporting rules in accordance with aspects of the subject disclosure.
Figure 8:
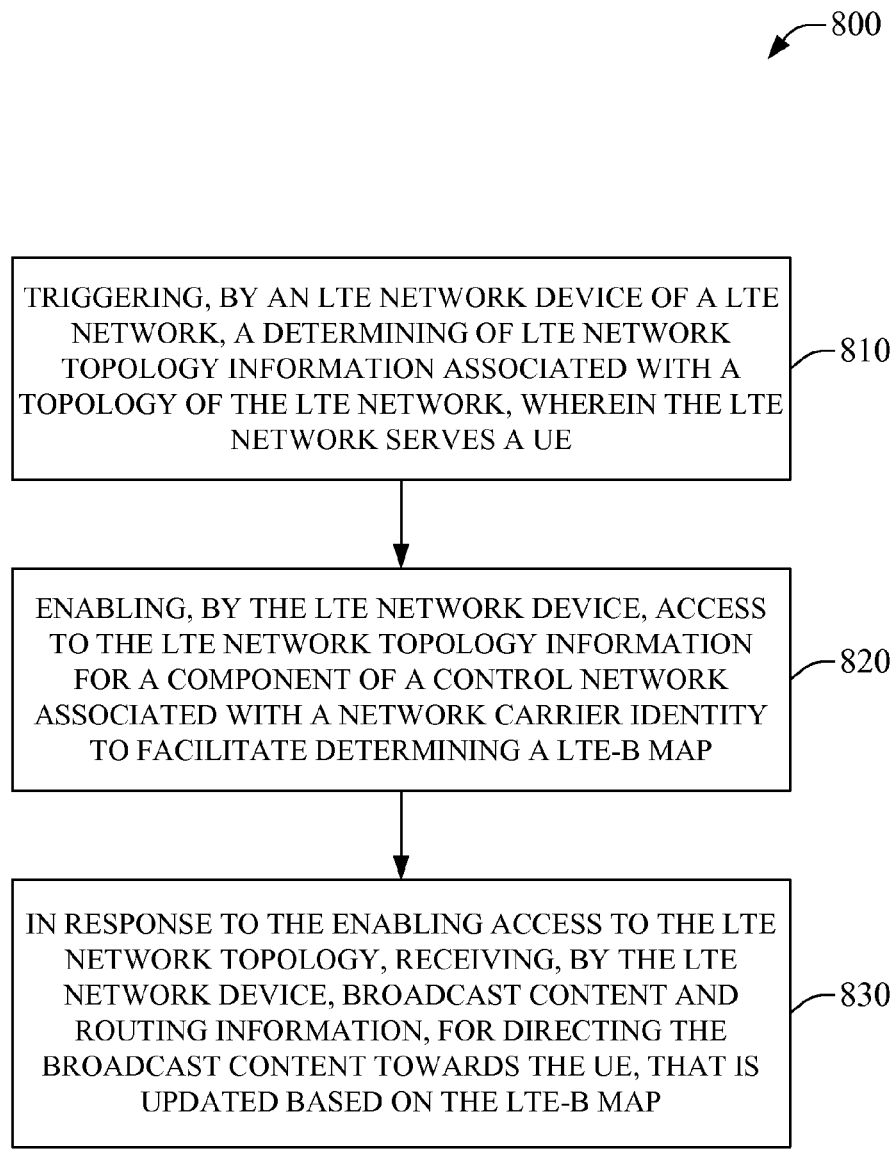
FIG. 8 illustrates an example method facilitating reporting topology via a device of an LTE network and receiving network managed broadcast content for delivery in response to reporting topology in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates a method 600 facilitating network management for content broadcast in accordance with aspects of the subject disclosure. At 610, method 600 can comprise receiving network information. Network information can comprise topology information, provisioning information, performance information, traffic information, utilization information, historical information, etc. This network information can facilitate adapting a configuration of an LTE-B network and/or determining aspects of establishing new sessions or adapting existing sessions for broadcast of content on an LTE-B network.

At 620, method 600 can comprise determining multimedia broadcast multicast service (eMBMS) mapping information. This can be based on the network topology information and broadcast service information. Broadcast service information can comprise customer agreements, service provider agreements, etc., piracy protection, restrictions based on the subject matter of the broadcast content, e.g., illegal and/or immoral materials, etc. As such, the mapping can reflect aspects of the content and aspects of the LTE-B network topology to provide a well-managed broadcast delivery experience. In some embodiments, the eMBMS mapping information can be determined from the network topology information prior to applying the broadcast service information to the mapping information as part of establishing, maintaining, or updating an LTE-B session, however this is not illustrated for the sake of clarity and brevity, although it is well within the scope of the presently disclosed subject matter.

At 630, network topology can be updated by method 600. The updating of the network topology can be based on the eMBMS mapping information. In an embodiment an LTE-B network can be managed in response to information received at 610 and/or determined at 620. As an example, alterations to the topology of an LTE-B network can comprise, for example, moving a UE from a first burdened eNB to another less burdened eNB in response to receiving information from that the first eNB is burdened. As another example, routing information through a newly added network edge device, e.g., a newly added Wi-Fi AP, etc., can be restricted until a history of effective service has been established. As a further example, LTE-B traffic through a network edge device, e.g., a femtocell, etc., can be increased based on historical information reflecting excellent eMBMS service At 640, system 600 can comprise enabling broadcast content delivery from a broadcast component to a UE. At this point Method 600 can end. The enabling broadcast content delivery can be based on the EMBMS mapping information determined at 620. In an aspect, method 600 can provide for establishing a new eMBMS session, maintaining an existing eMBMS session, updating an existing eMBMS session, etc., based on analysis of the network information from 610 and the determined eMBMS mapping information from 620.

In an aspect, method 600 can provide for real-time, or near-real-time, correction for changes in an LTE-B network. Moreover, in some embodiments, method 600 can be employed in a carrier-network core-device. This can be highly efficient where a carrier-network is already associated with management and control of an LTE network that operates as a portion of an LTE-B network. Moreover, centralization of method 600 can allow broadcast content providers to avoid management of network components and to more simply rely on a carrier to provide management as a service on core-network components associated with the carrier-network.

FIG. 7 illustrates a method 700 that facilitates network management for content broadcast subject to topology reporting rules in accordance with aspects of the subject disclosure. At 710, method 700 can comprise allowing access to an LTE network topology reporting rule. The LTE network topology reporting rule can relate to conditions under which an LTE network component is directed to report topology information to an LTE-B network management component. These rules can reduce network control traffic by allowing LTE network components to determine when to report topology information in accordance with one or more LTE network topology reporting rule(s).

At 720, LTE network topology information can be received. The receiving of LTE network topology information can be in accord with the LTE network reporting rule. This network topology information can comprise topology information in conjunction with supplemental information, such as, provisioning information, performance information, traffic information, utilization information, historical information, etc. Furthermore, the LTE network topology information can be associated with an LTE network, more specifically, an LTE network associated with an LTE-B or LTE network for carrying broadcast content.

At 730, method 700 can comprise determining LTE-B mapping information. The LTE-B mapping information can be based on the LTE network topology information. In an aspect, the LTE-B mapping information can also be based on broadcast service information, as disclosed elsewhere herein. In some embodiments, LTE-B mapping information can reflect the real-time, or near-real-time, state of LTE-B network.

At 740, method 700 can comprise enabling broadcast content delivery from a broadcast component to a UE via the LTE network based on the LTE-B mapping information. At this point method 700 can end. Establishment of LTE-B sessions can be based on the LTE-B mapping information. In some embodiments, additional information can also be included in demining LTE-B session establishment, provisioning, maintenance/updating of existing sessions, etc. As an example, broadcast content can be analyzed for compliance with one or more rules, e.g., rules can relate to encoding, resolution, content restrictions, content classification, rights to broadcast the content, etc.

Method 700 can provide for one or more common points of entry into one or more LTE-B networks, for one or more broadcast services, wherein the maintenance and management of the LTE-B network can be moved away from numerous competing broadcast services, and rather can be performed by an integrated network and service management layer. In some embodiments this integrated network and service management layer can be embodied in a carrier-network core-network component. Moreover, content itself can play a role in LTE-B session establishment or maintenance, allowing for effective quality control with regard to the broadcast content. This can aid in effective dissemination of the broadcast content that accords with the condition or state of an LTE-B network, e.g., the evolving topology of the LTE-B network, etc., as well as customer agreements, service provider agreements, etc., piracy protection, restrictions based on the subject matter of the broadcast content, e.g., illegal and/or immoral materials, etc., and simplifies and consolidates management of the LTE-B network by integrating and/or centralizing the components executing the method.

FIG. 8 illustrates a method 800 that facilitates reporting topology via a device of an LTE network and receiving network managed broadcast content for delivery in response to reporting topology in accordance with aspects of the subject disclosure. At 810, method 800 can comprise triggering, by an LTE network device of an LTE network, a determination of LTE network topology information. The LTE network topology information can be associated with an LTE topology of the LTE network. Further, the LTE network serves a UE. In an aspect, an LTE-B network can comprise components such as broadcast/multicast service center (BMSC) components, etc., and LTE network components, such as, media gateway (MGW) components, mobility management entity (MME) components, eNBs. Method 800 can be performed by any LTE network component or any LTE-B network component. In an aspect, the triggering can be based upon a rule received by the LTE or LTE-B component. A rule can be related to reporting changes in network topology, changes in conditions associated with elements of a network, etc. As an example, the addition of a Wi-Fi AP or femtocell to a network can trigger the determining of LTE network topology. As another example, historical characteristics of a network component can trigger the determining of the LTE network topology. It will be appreciated that numerous other network component conditions, states, transitions, etc., can trigger the determining of the LTE network topology and these are expressly considered within the scope of the present disclosure although they are not enumerated here for the sake of clarity and brevity.

At 820, method 800 can comprise enabling access to the LTE network topology information by the LTE network device. Access to the LTE network topology information can be enabled for a component of a control network associated with a network carrier identity. Further, the access can facilitate the component of the control network determining an LTE-B map. In an aspect, this determining of the LTE-B map can be real-time or near-real-time where the triggering of 810 and the access of 820 are also real-time or near-real-time.

At 830, in response to the enabling access to the LTE network topology, method 800 can comprise receiving, the LTE network device, broadcast content and routing information. At this point method 800 can end. The routing information can be employed for directing the broadcast content towards the UE and can be updated based on the LTE-B map.

Method 800 illustrates components or devices of an LTE network interacting with a control network component, e.g., a component associated with an integrated network and service management layer. This integrated network and service management layer can be comprised in a carrier-network core-component.

Figure 9:
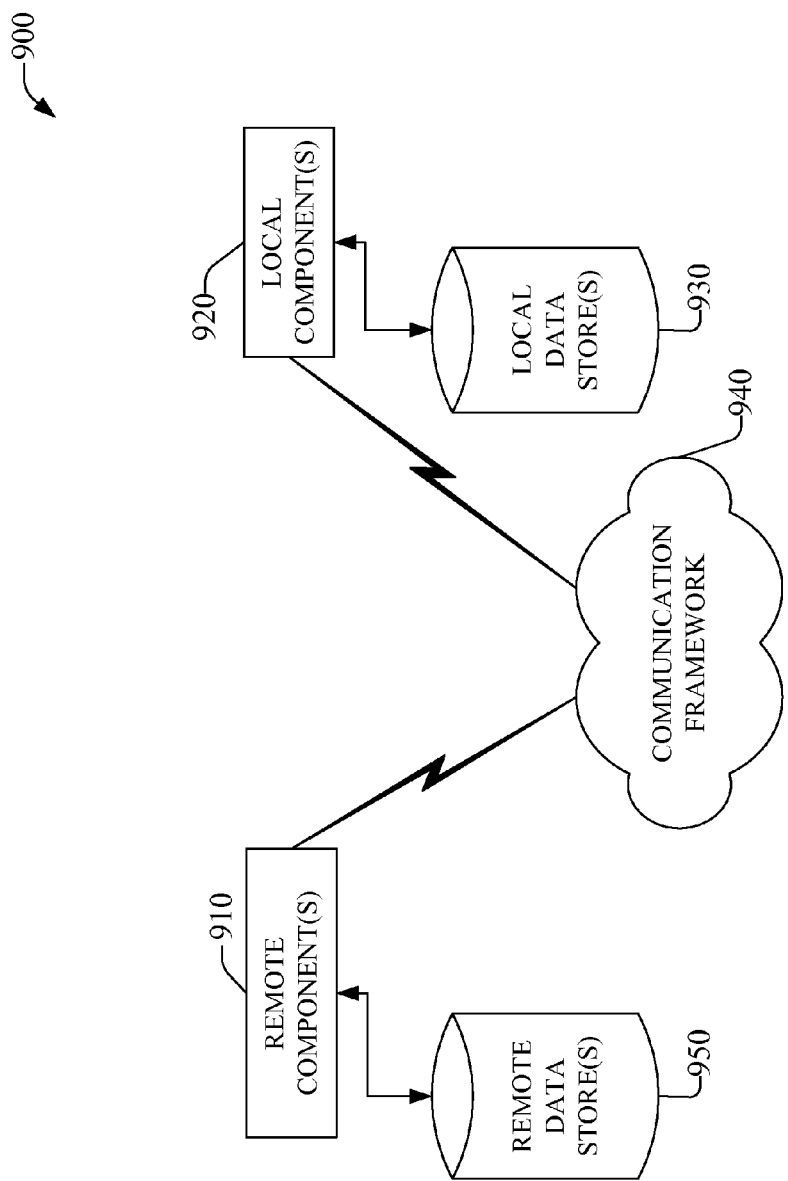
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise servers, personal servers, wireless telecommunication network devices, etc. As an example, remote component(s) 910 can be LTE-B network management component 110, 210, 310 etc., LTE-B service management component 120, 220, 320, etc., integrated network and service management layer component 330, 430, 530, etc., LTE management layer component 406, 506, etc.

The system 900 also comprises one or more local component(s) 920. The local component(s) 920 can be hardware and/or software (e.g., threads, processes, computing devices). In some embodiments, local component(s) 920 can comprise, for example, LTE-B network 190, 290, 291, etc., LTE network 496, 596, 597, etc., BMSC component 160, 460, 560, 561, etc., MGW component 162, MME component(s) 164, eNB component(s) 166, UE 168, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network. Remote component(s) 910 can be operably connected to one or more remote data store(s) 950, such as a hard drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
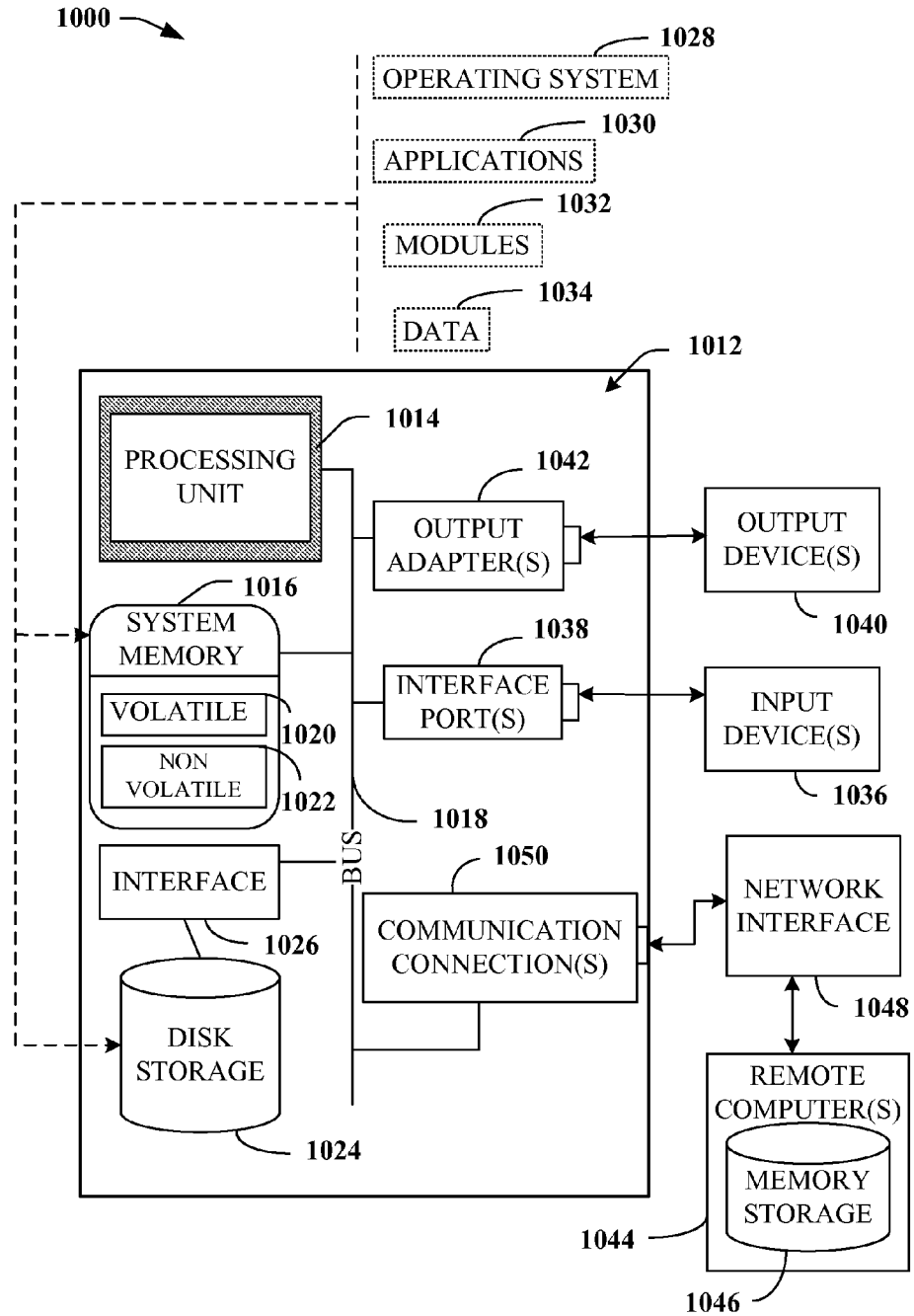
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of, LTE-B network management component 110, 210, 310 etc., LTE-B service management component 120, 220, 320, etc., integrated network and service management layer component 330, 430, 530, etc., LTE management layer component 406, 506, etc., LTE-B network 190, 290, 291, etc., LTE network 496, 596, 597, etc., BMSC component 160, 460, 560, 561, etc., MGW component 162, MME component(s) 164, eNB component(s) 166, UE 168, etc., comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: receiving trigger information a remote device, e.g., a UE, and in response, generating communication augmentation information that can be accessed via an air interface or other wireless interface by one or more service interface components or other UEs to enable context sensitive communication augmentation.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse input GUI, a command line controlled interface, etc., allowing a user to interact with computer 1012. As an example, UI Component 252 can receive touch, motion, audio, visual, or other types of input. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        receiving network information related to a device of a long term evolution (LTE) broadcast (LTE-B) network, wherein the device is located remotely from the processor and the memory, and wherein the device is providing access to content being broadcast in a current LTE-B session;
        in response to receiving updated network information, determining updated LTE-B mapping information based on the updated network information for the current LTE-B session; and
        adapting the current LTE-B session into an adapted LTE-B session based on the updated LTE-B mapping information, wherein the adapted LTE-B session comprises content broadcast by a content provider device associated with a content provider identity, and wherein the content provider device is remotely located from the device and is remotely located from the processor and the memory.

2. The system of claim 1, wherein the adapting the current LTE-B session is further based on a characteristic of content for broadcast via the adapted LTE-B session.

3. The system of claim 1, wherein the adapting the current LTE-B session into the adapted LTE-B session comprises establishing a new LTE-B session based on the updated LTE-B mapping information.

4. The system of claim 1, wherein the adapting the current LTE-B session into the adapted LTE-B session comprises modifying the current LTE-B session based on the updated LTE-B mapping information.

5. The system of claim 1, wherein the adapting the current LTE-B session into the adapted LTE-B session comprises terminating a LTE-B session based on the updated LTE-B mapping information.

6. The system of claim 1, wherein the operations further comprise, enabling access to a reporting rule related to causing a component of the LTE-B network to facilitate access to the network information.

7. The system of claim 6, wherein the reporting rule is related to causing the component of the LTE-B network to facilitate access to the network information in response to determining a change in the LTE-B network topology.

8. The system of claim 1, wherein the determining the updated LTE-B mapping information occurs in response to a change in a topology of the LTE-B network.

9. The system of claim 1, wherein the processor is comprised in a core-network device associated with a carrier identity.

10. The system of claim 1, wherein the device of the LTE-B network is a first device of a first LTE-B network, wherein the network information is first network information, wherein the updated LTE-B mapping information is first LTE-B mapping information, and wherein the operations further comprise:
    receiving second network information related to a second device of a second LTE-B network, wherein the second device is located remotely from the processor and the memory;
    in response to the receiving the updated second network information, determining second LTE-B mapping information based on the updated second network information; and
    adapting the current LTE-B session into the adapted LTE-B session based on the first LTE-B mapping information and the second LTE-B mapping information.

11. A method, comprising:
    receiving, by a system comprising a processor located at a carrier network core-network device, network topology information related to a change in a topology of a long term evolution (LTE) broadcast (LTE-B) network comprising a content distribution device external to the carrier network core-network device, broadcasting content for a current LTE-B session;
    determining, by the system, updated LTE-B mapping information based on the network topology information; and
    establishing, by the system, an adapted LTE-B session from the current LTE-B session based on the updated LTE-B mapping information and content information corresponding to aspects of content for broadcast via the adapted LTE-B session, wherein the content is received from a content provider device located external to the carrier network core-network device and external to the content distribution device.

12. The method of claim 11, wherein the establishing comprises creating a new LTE-B session based on the updated LTE-B mapping information and the content information.

13. The method of claim 11, wherein the establishing comprises replacing the current LTE-B session with a new LTE-B session based on the updated LTE-B mapping information and the content information.

14. The method of claim 11, wherein the receiving the network topology information comprises receiving the network topology information from an LTE management layer device associated with managing LTE components comprising the LTE-B network.

15. The method of claim 11, wherein the receiving the network topology information comprises receiving the network topology information from an LTE component comprising the LTE-B network.

16. The method of claim 11, wherein the receiving the network topology information is in response to a condition relating to the LTE-B network being determined to be satisfied.

17. The method of claim 16, wherein the condition relating to the LTE-B network relates to an addition of an edge-node device to the LTE-B network.

18. A machine-readable storage device comprising executable instructions that, when executed by a processor facilitate performance of operations, comprising:

in response to determining a change in a topology of a long term evolution (LTE) broadcast (LTE-B) network facilitating a current LTE-B session, receiving, at a network provider core-network device that is distinct from the LTE-B network, updated network topology information related to the LTE-B network;

determining updated LTE-B mapping information based on the updated network topology information; and provisioning an adapted LTE-B session based on the current LTE-B session and on the updated LTE-B mapping information, to enable distribution of broadcast content, received from a content provider device that is distinct from the LTE-B network and distinct from the network provider core-network device, to an edge device of the LTE-B network.

19. The machine-readable storage device of claim 18, wherein the provisioning the adapted LTE-B session comprises provisioning a new LTE-B session.

20. The machine-readable storage device of claim 18, wherein the determining the change in the topology of the LTE-B network is based on determining that a device of the LTE-B network has received a rule related to reporting alteration of the topology of the LTE-B network.

* * * * *